United States Patent
Schnoll et al.

(10) Patent No.: US 8,608,309 B2
(45) Date of Patent: Dec. 17, 2013

(54) EYEGLASS SYSTEM

(75) Inventors: Jeffrey M. Schnoll, Lake Bluff, IL (US); Gwendolyn R. Kent, Lake Forest, IL (US); Inder Paul Singh, Lake Forest, IL (US)

(73) Assignee: A New Vision LLC, Lake Bluff, IL (US)

( * ) Notice: Subject to any disclaimer, the term of this patent is extended or adjusted under 35 U.S.C. 154(b) by 0 days.

(21) Appl. No.: 13/426,960

(22) Filed: Mar. 22, 2012

(65) Prior Publication Data
US 2013/0169923 A1 Jul. 4, 2013

Related U.S. Application Data

(60) Provisional application No. 61/581,789, filed on Dec. 30, 2011.

(51) Int. Cl.
*G02C 5/14* (2006.01)
*G02C 11/02* (2006.01)

(52) U.S. Cl.
CPC ..................... *G02C 11/02* (2013.01)
USPC ............................. 351/121; 351/52

(58) Field of Classification Search
CPC ...................................................... G02C 11/02
USPC ........... 351/41, 51, 52, 83, 86, 111, 119, 121, 351/153, 47–48, 57–58; 16/228
See application file for complete search history.

(56) References Cited

U.S. PATENT DOCUMENTS

| | | | | |
|---|---|---|---|---|
| 2,555,578 A * | 6/1951 | Davis | ............................ | 351/52 |
| 3,907,410 A | 9/1975 | Richmond et al. | | |
| 5,000,558 A * | 3/1991 | Blackstone | .................... | 351/41 |
| 5,185,620 A | 2/1993 | Cooper | | |
| 5,542,157 A * | 8/1996 | Herman | .................. | 24/113 MP |
| 5,784,142 A | 7/1998 | Mao | | |
| 6,834,952 B2 | 12/2004 | Polovin | | |
| 7,588,331 B2 * | 9/2009 | Burnstein | ....................... | 351/51 |
| 7,901,070 B2 | 3/2011 | Burnstein | | |
| 2009/0128773 A1 | 5/2009 | Wang | | |
| 2010/0220282 A1 | 9/2010 | Moritz et al. | | |

FOREIGN PATENT DOCUMENTS

WO 2009128637 A2 10/2009

OTHER PUBLICATIONS

Web page for Crocs Eyewear sunglasses; Eyeking LLC; <http://www.eyeking.com/brands/crocs-eyewear.html>; printed Mar. 5, 2012.
International Search Report for PCT/US2012/071647 mailed Apr. 25, 2013.
Written Opinion of International Searching Authority for PCT/US2012/071647 mailed Apr. 25, 2013.

* cited by examiner

*Primary Examiner* — Huy K Mai
(74) *Attorney, Agent, or Firm* — Ungaretti & Harris LLP

(57) ABSTRACT

An eyeglass system having interchangeable components. The eyeglass system includes right and left temples that are connected to a front frame via a decorative pin. The pin is easily removed to allow one to replace the temples with those having another style, or use the temples with another frame. A front cover can also be connected to the frame via the pin to further change the style or design of the eyeglasses.

18 Claims, 5 Drawing Sheets

EYEGLASS SYSTEM

CROSS-REFERENCE TO RELATED APPLICATIONS

The present application claims the benefit of U.S. Provisional Patent Application No. 61/581,789 filed Dec. 30, 2011, the contents of which are incorporated herein by reference.

FEDERALLY SPONSORED RESEARCH OR DEVELOPMENT

N/A

FIELD OF THE INVENTION

The present invention generally relates to an eyeglass system that includes interchangeable eyeglass components. The eyeglass system also includes a decorative pin or dart which can also be used to connect the temples to the lens frame components.

DESCRIPTION OF THE PRIOR ART

Eyewear, such as eyeglasses or sunglasses, comes in a large variety of shapes, styles and designs. However, because such eyewear can be costly—especially ones having certain types of prescription lenses—a wearer typically must select a single shape, style or design. While some styles can be worn for any occasion, other styles might not be appropriate for both an informal casual setting (e.g., a party) as well as a more formal setting (e.g., an office job). Additionally, only having a single or limited number of styles makes it difficult for the wearer to fit the style to the wearer's current mood or setting, or reflect the wearer's personality.

The present invention is designed to overcome problems associated with prior eyeglass systems.

SUMMARY OF THE INVENTION

The present invention provides an eyeglass system that includes decorative and interchangeable components. The system allows one to change the components to obtain different eyeglass designs.

The eyeglass system includes connector pins which quickly secure temples or arms to a front frame portion via a hinge component. The connector pins can also be used to connect different cover portions to the front frame portion of the system. By using the connector pins, one can quickly change the arms, cover, or front frame portion to create an eyeglass system with a new look or style. Moreover, the connector pins can include a decorative surface, and can themselves be interchanged to change the look of the system.

In accordance with one embodiment of the invention, a reconfigurable eyeglass system is provided. The reconfigurable eyeglass system comprises a front frame having a right lens holder and a left lens holder. The front frame further includes a first end portion on a first end of the front frame having a first opening, and a second end portion on a second end of the front frame having a second opening. The openings are preferably circular and can include internal threading.

The system also includes a first right arm connectable to the first end portion of the front frame by a first hinge. The first hinge includes a first arm hinge portion and a second frame hinge portion. The second frame hinge portion has an opening configured for alignment with the first opening of the first end portion of the front frame. Additionally, the system includes a first left arm connectable to the second end portion of the front frame by a second hinge. Similar to the first hinge, the second hinge has a first arm hinge portion and a second frame hinge portion where the second frame hinge portion includes an opening configured for alignment with the second opening of the second end portion of the front frame.

The system includes a first connector pin positioned in the first opening of the first end portion of the front frame and the opening of the second frame hinge portion of the first hinge, and a second connector pin positioned in the second opening of the second end portion of the front frame and the opening of the second frame hinge portion of the second hinge. The first and second connectors each include an outer exposed decorative surface.

The system can also include a first front frame cover connectable to the front frame of the eyeglass system. The first front frame cover includes a first end portion having a first opening and a second end portion having a second opening. The first frame cover is connected to the eyeglass system by the first connector pin extending through the first opening of the first end of the first front frame cover and the second connector pin extending through the second opening of the second end of the first front frame cover. Additionally, the system can include a second front frame cover having a different style than the first front cover.

To further change the style of the glasses, the system can include a second right arm and a second left arm connectable to the first front frame by the first connector pin and the second connector pin. The style can also be changed by changing the connector pins. In this regard, the system can include a third connector pin and a fourth connector pin having different decorative surfaces than the first and second connector pins.

The first connector pin and second connector pin can include a threaded stem portion. This can be used to mate with internal threads in the openings of the frame, cover and/or hinge portions. The threaded stem portion can be designed to have a distinct starting point and ending point configured to properly align a design on the decorative surface.

The connector pins can includes an internal spring element. The connector pins can further include a cap having internal teeth configured to engage the internal spring element. This can allow for rotation of the decorative surface after the pin is installed in the system.

In another embodiment, a changeable eyeglass system is provided. The eyeglass system comprises a front frame portion having a right lens holder and a left lens holder, a right arm extending from a first end portion of the front frame portion and a left arm extending from a second end portion of the front frame portion. A first connector pin connects the right arm to the first end portion of the front frame portion and a second connector pin connects the left arm to the second end portion of the front frame portion. A front frame cover portion is connected to the front frame portion to change the style of the glass system.

The connector pins can include various images on the exposed surfaces. For those used in a particular eyeglass system, the images can be the same for both pins, or each pin can have a different image. Moreover, additional connector pins with different images can be substituted for the ones in use.

In one embodiment of the invention the front frame cover portion can be snap-fitted onto the front frame portion. The cover can include a lip along one or more edges to engage the front frame.

The first end portion of the front frame portion can include a first opening and the second end portion of the front frame portion includes a second opening. The front frame cover portion also includes a first end portion having a first opening aligned with the first opening of the first end portion of the front frame portion, and a second end portion having a second opening aligned with the second opening of the second end portion of the front frame portion. To hold the assembly together, the first connector pin is positioned through the first opening in the first end of the front frame portion and the first opening of the first end portion of the front frame cover portion, and the second connector pin is positioned through the second opening in the second end of the front frame portion and the second opening of the second end portion of the front frame cover portion.

The assembly can further include a first hinge component connecting the right arm to the first end portion of the front frame portion. The first hinge component also has an opening aligned with the first opening in the first end portion of the front frame portion. Similarly, a second hinge component connects the left arm to the second end portion of the front frame portion. The second hinge component has an opening aligned with the second opening in the second end portion of the front frame portion.

Further aspects of the invention are disclosed in the description of the invention, including the Figures.

BRIEF DESCRIPTION OF THE DRAWINGS

To understand the present invention, it will now be described by way of example, with reference to the accompanying drawings in which.

DETAILED DESCRIPTION

Figure 1:
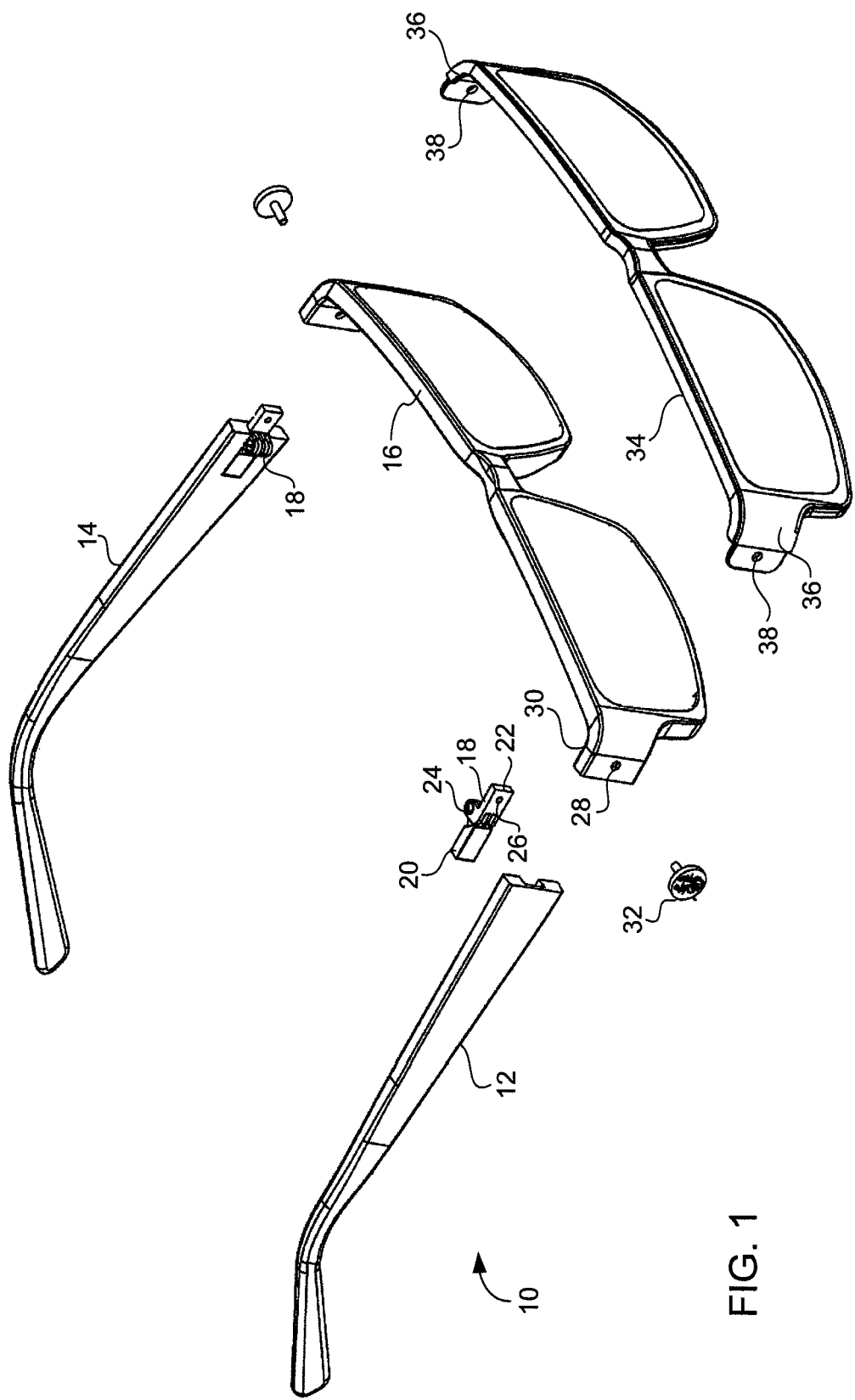
FIG. 1 is an exploded perspective view of an embodiment of an eyeglass system in accordance with the present invention.

While this invention is susceptible of embodiments in many different forms, there is shown in the drawings what will herein be described in detail preferred embodiments of the invention with the understanding that the present disclosure is to be considered as an exemplification of the principles of the invention and is not intended to limit the broad aspect of the invention to the embodiments illustrated.

As illustrated in the exploded view of FIG. 1, the present invention provides an eyeglass system 10 configured to allow components of the system to be modified or interchanged. The system 10 allows one to create a unique pair of eyeglasses, and to change the look of various aspects of the eyeglasses as desired.

The eyeglass system 10 includes a right temple or arm 12 and a left temple or arm 14 that connect to a frame front 16. The frame front 16 is configured to hold prescription and/or sunglass lenses.

Figure 5:
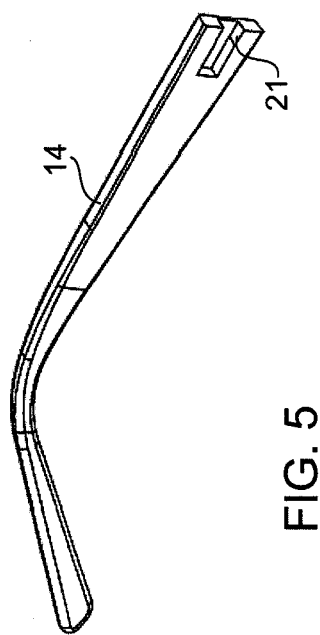
FIG. 5 is a perspective view of the left temple or arm of the eyeglass assembly of FIG. 1 without attachment of a hinge element.
Figure 6:
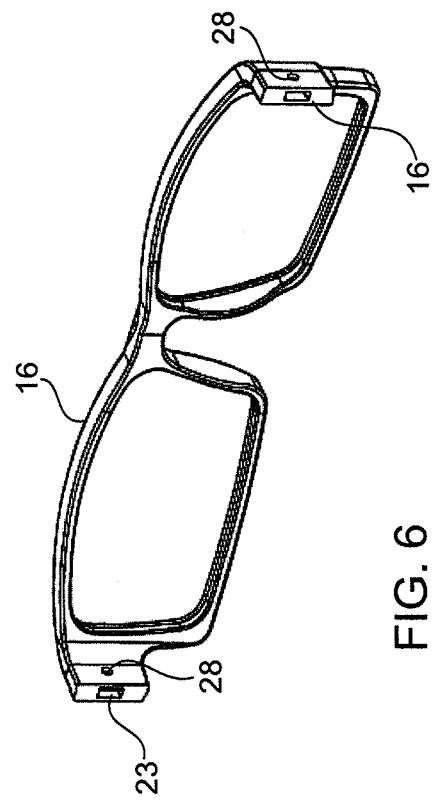
FIG. 6 is a perspective view of a back side of the frame of the eyeglass assembly of FIG. 1.

As shown in FIG. 1, first and second hinge components 18 are used to connect the temples 12, 14 to the frame front 16. The hinge components 18 include a temple hinge element 20 and a frame front hinge element 22. The hinge elements 20, 22 pivot about a hinge screw portion 24. The temple hinge element 20 is configured to fit in a recess 21 in the respective temple 12, 14 (see e.g., the left temple 14 in FIG. 5). Alternatively, the temples 12, 14 can include a slot similar to a slot 23 in the frame 16 for receiving the frame front hinge element 22 (see e.g., back of frame front 16 in FIG. 6).

The hinge components 18 also include a threaded opening 26 that—when connected to the frame front 16—aligns with a threaded opening 28 in an end piece 30 of the frame front 16. A pin 32 can be inserted into the openings 26, 28 to secure the frame front 16 to the temples 12, 14 through the hinge component 18. Although not shown in FIG. 1, the pin 32 is preferably threaded to enable it to be screwed into the threaded openings. In one alternative embodiment, the pin does not necessarily include threads and can be snapped into place.

In accordance with the novel aspects of the invention, the ease of connecting the temples 12, 14 to the frame 16 via the pin 32 allows one to quickly and easily replace one or both temples 12, 14, or the frame front 16 with other temples or frames having a different style, color, design, etc.

In addition to the interchangeable nature of the temples and front frame, alternative frame covers 34 could also be utilized to change the look of the eyeglass system 10 without requiring changing the frame front 16 (which typically contains prescription lenses). As shown in FIG. 1, one potential frame cover 34 includes end pieces 36 having an opening 38 which may be threaded. The opening 38 aligns with the openings 28 and 26 on the frame front 16 and hinge component 18 and is held in place to the eyeglass system 10 by the pin 32.

The eyeglass system 10 can be utilized with sunglass lenses and/or prescription lenses. The frame covers 34 are useful for prescription glasses because it may be cost prohibitive to have more than one or two frames 16 with prescription lenses. Changing just the cover 34 allows the user to change the look of the eyeglass system 10 without having to change the lenses.

The pin 32 includes an outer plate or head portion that can includes an exposed area for use as a decorative surface. The decorative surface can be any design, figure, initials, team emblem, or other indicia, etc. desired. For certain designs, the pin 32 can include a threading arrangement wherein the threads have a particular starting and stopping point to ensure proper alignment of the design with the glass system 10. For example, the threading arrangement is used so that designs having a clear up and down (e.g., a character, a word/letter design, etc.), are properly aligned to appear in the correct orientation when the pin is screwed onto the eyeglass system 10. This prevents, for example, a figure appearing sideways as opposed to standing up.

The decorative surface is shown as being circular in the embodiments of FIGS. 1-8. However, the surface can be any of a variety of regular or irregular shapes (e.g., triangular, square, etc.). Additionally, the decorative surface does not have to be flat. Instead, it can be molded to include various features (e.g., such as a half sphere which can be used in conjunction with certain designs such as a soccer ball or baseball).

With the present eyeglass system 10, one can have a variety of different pins, temples, frames and/or frame covers that can be interchanged. This allows the wearer to create a large variety of eyewear to fit the wearer's mood or situation (e.g., casual or formal events).

Figure 4:
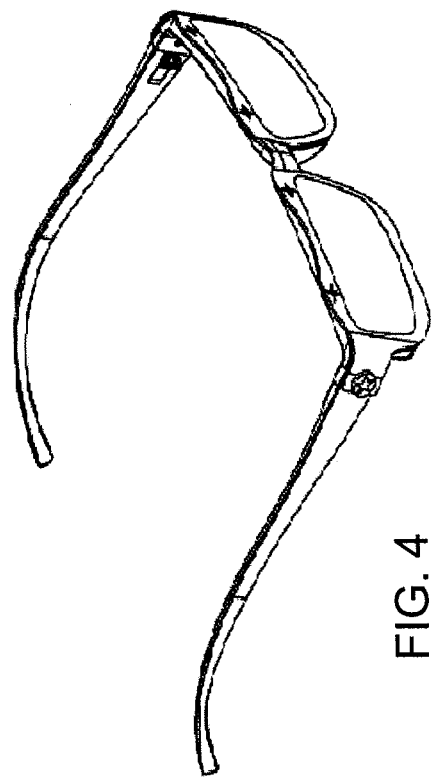
FIG. 4 is a perspective view of the eyeglass system of FIG. 3.
Figure 2:
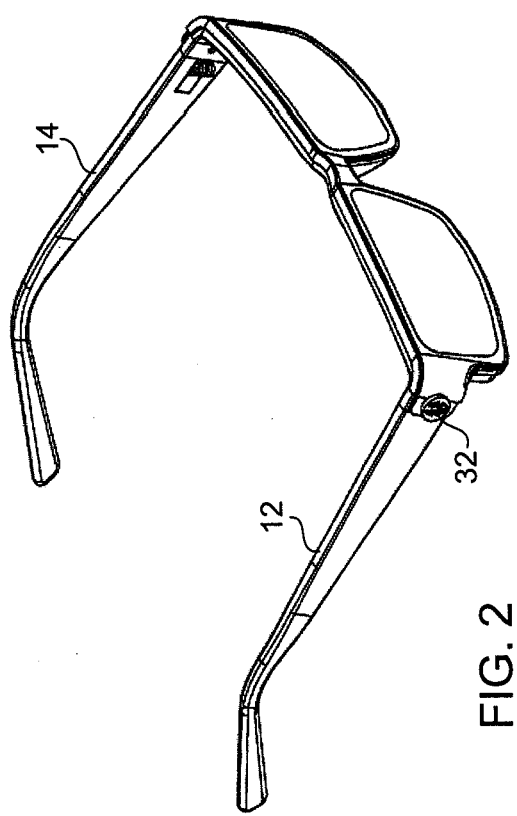
FIG. 2 is a perspective view of the eyeglass system of FIG. 1.
Figure 3:
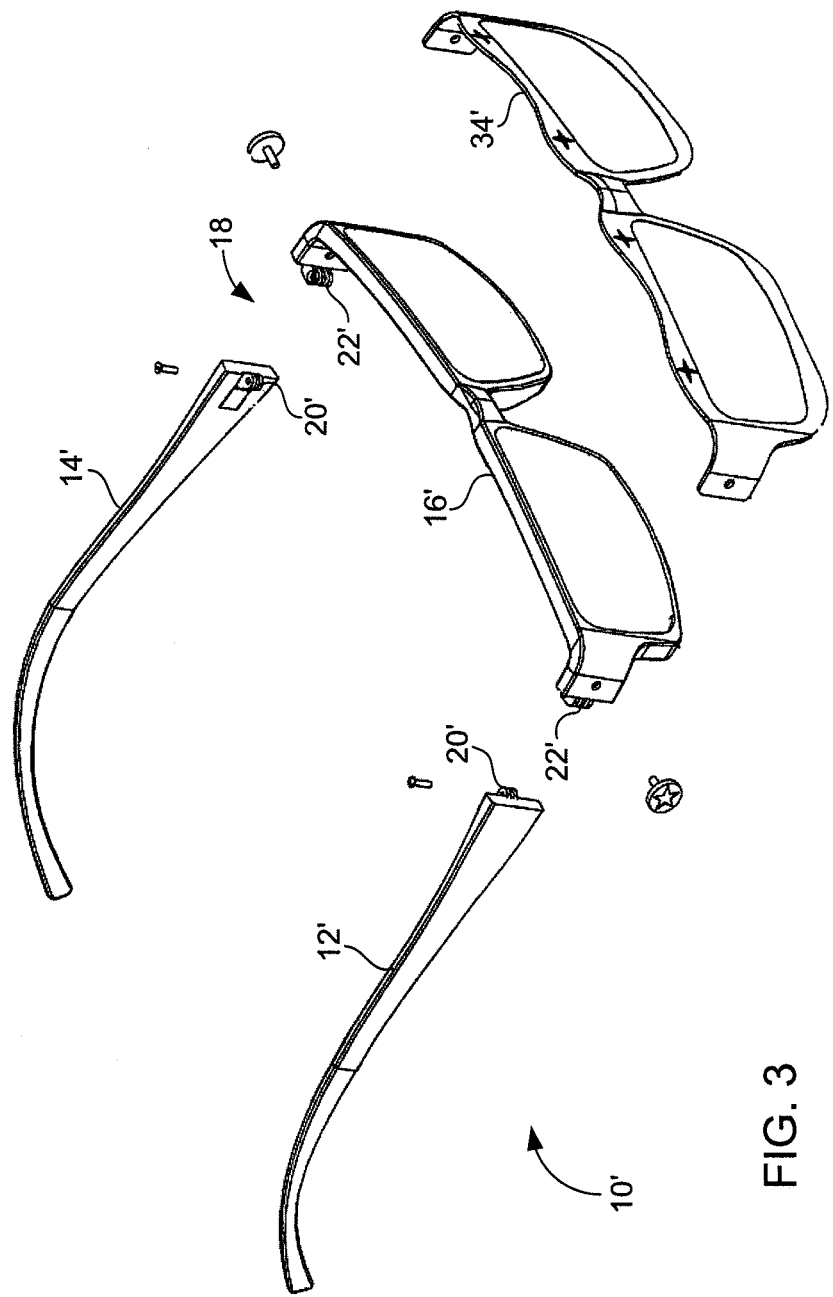
FIG. 3 is an exploded perspective view of another embodiment of an eyeglass system in accordance with the present invention.

FIGS. 3 and 4 show another embodiment of the eyeglass system 10' with a frame cover 34' having a more decorative design. The exploded view of the eyeglass system 10' also shows the hinge component 18 in two pieces with the temple hinge element 20' connected to the temples 12', 14' and the frame front hinge element 22' connected to frame front 16', respectively. A hinge screw portion 24' is shown floating between the hinge elements 20', 22'.

Figure 7:
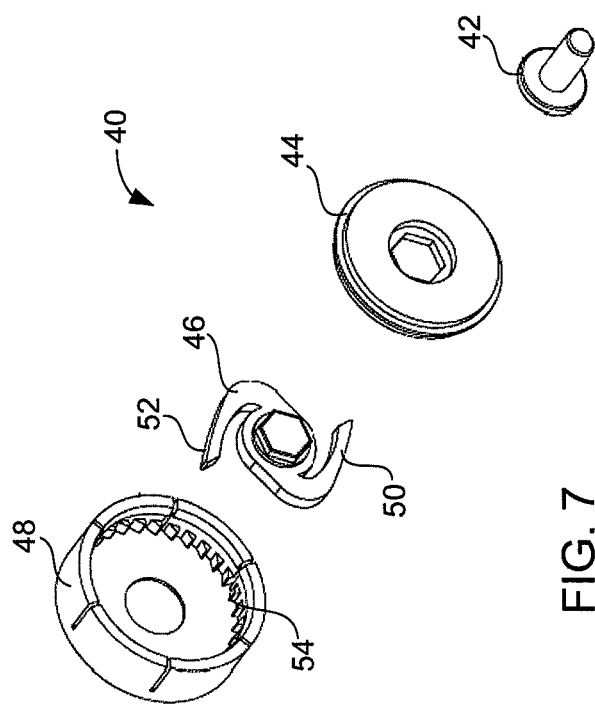
FIG. 7 is an exploded view of a modified pin for use with the eyeglass assemblies of the present invention; and, FIG. 8 is a perspective view of the modified pin from a back side.
Figure 8:
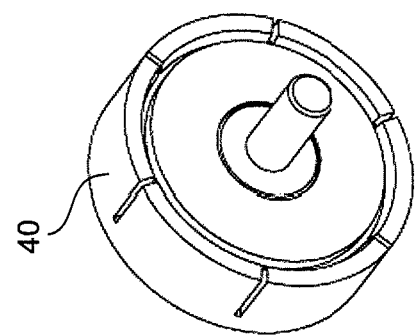

FIGS. 7 and 8 disclose another embodiment of a pin 40 for use with the eyeglass systems disclosed. The pin 40 includes a threaded (threadings not shown) screw portion 42 that includes a circular top configured to mate with a circular opening or recess in a first side of a disk 44. A spring element 46 is provided having a hexagon shaped central portion configured to mate with a hexagon shaped recess on a second side of the disk 44. The spring element 46 is configured to fit in a cap 48. The disk 44 can include threading along an outer circumference of the disk 44 to mate with internal threading in the cap 48 to secure the disk 44 in the cap 48.

The spring element 46 includes a first arm 50 and a second arm 52 that are designed to engage internal teeth 54 in the cap 48. The configuration of the first and second arms 50, 52 with the teeth 54 of the cap allows for rotation of the cap 48 in one direction (to correct for any alignment problems with respect to any design on the outer surface of the pin 40).

Many modifications and variations of the present invention are possible in light of the above teachings. It is, therefore, to be understood within the scope of the appended claims the invention may be protected otherwise than as specifically described.

We claim:

1. A reconfigurable eyeglass system comprising:
   a front frame having a right lens holder and a left lens holder, the front frame including a first end portion on a first end of the front frame having a first opening, and a second end portion on a second end of the front frame having a second opening;
   a first right arm connectable to the first end portion of the front frame by a first hinge having a first arm hinge portion and a second frame hinge portion, the second frame hinge portion including an opening configured for alignment with the first opening of the first end portion of the front frame;
   a first left arm connectable to the second end portion of the front frame by a second hinge having a first arm hinge portion and a second frame hinge portion, the second frame hinge portion including an opening configured for alignment with the second opening of the second end portion of the front frame;
   a first front frame cover including a first end portion having a first opening aligned with the first opening of the first end portion of the front frame and a second end portion having a second opening aligned with the second opening of the second end portion of the front frame;
   a first connector pin positioned in the first opening of the first end portion of the front frame and the opening of the second frame hinge portion of the first hinge and the first opening of the first end portion of the first front frame cover, the first connector pin having an outer exposed decorative surface; and,
   a second connector pin positioned in the second opening of the second end portion of the front frame and the opening of the second frame hinge portion of the second hinge and the second opening of the second end portion of the first front frame cover, the second connector pin having an outer exposed decorative surface.

2. The reconfigurable eyeglass system of claim 1 further comprising a second front frame cover.

3. The reconfigurable eyeglass system of claim 1 further comprising a second right arm and a second left arm connectable to the first front frame by the first connector pin and the second connector pin.

4. The reconfigurable eyeglass system of claim 1 comprising a third connector pin and a fourth connector pin.

5. The reconfigurable eyeglass system of claim 1 wherein each of the first connector pin and second connector pin has a threaded stem portion.

6. The reconfigurable eyeglass system of claim 5 wherein the threaded stem portion has a starting point and ending point configured to properly align a design on the decorative surface.

7. The reconfigurable eyeglass system of claim 1 wherein the first connector pin includes an internal spring element.

8. The reconfigurable eyeglass system of claim 7 wherein the first connector pin includes a cap having internal teeth configured to engage the internal spring element.

9. The reconfigurable eyeglass system of claim 1 wherein the first connector pin and the second connector pin are formed from plastic.

10. An eyeglass system comprising:
    a front frame portion having a right lens holder and a left lens holder;
    a right arm extending from a first end portion of the front frame portion and a left arm extending from a second end portion of the front frame portion;
    a first connector pin connecting the right arm to the first end portion of the front frame portion;
    a second connector pin connecting the left arm to the second end portion of the front frame portion; and,
    a front frame cover portion connected to the front frame portion by the first connector pin and the second connector pin.

11. The eyeglass system of claim 10 wherein the first connector pin includes an exposed surface having a first image thereon.

12. The eyeglass system of claim 11 wherein the second connector pin includes an exposed surface having the first image thereon.

13. The eyeglass system of claim 11 wherein the second connector pin includes an exposed surface having a second image different than the first image thereon.

14. The eyeglass system of claim 10 wherein the front frame cover portion is snapped-fit onto the front frame portion.

15. The eyeglass system of claim 10 wherein the first end portion of the front frame portion includes a first opening and the second end portion of the front frame portion includes a second opening.

16. The eyeglass system of claim 15 wherein the front frame cover portion includes a first end portion having a first opening aligned with the first opening of the first end portion of the front frame portion, and a second end portion having a second opening aligned with the second opening of the second end portion of the front frame portion.

17. The eyeglass system of claim 16 wherein the first connector pin is positioned through the first opening in the first end of the front frame portion and the first opening of the first end portion of the front frame cover portion, and the second connector pin is positioned through the second opening in the second end of the front frame portion and the second opening of the second end portion of the front frame cover portion.

18. The eyeglass system of claim 17 further comprising a first hinge component connecting the right arm to the first end portion of the front frame portion, the first hinge component having an opening aligned with the first opening in the first end portion of the front frame portion, and a second hinge component connecting the left arm to the second end portion of the front frame portion, the second hinge component having an opening aligned with the second opening in the second end portion of the front frame portion.

* * * * *